US008260952B2

(12) United States Patent
Sengupta et al.

(10) Patent No.: US 8,260,952 B2
(45) Date of Patent: Sep. 4, 2012

(54) MULTI-RATE PEER-ASSISTED DATA STREAMING

(75) Inventors: Sudipta Sengupta, Redmond, WA (US); Minghua Chen, Shatin (HK); Jin Li, Sammamish, WA (US); Philip A. Chou, Bellevue, WA (US); Miroslav Ponec, New York, NY (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 12/023,286

(22) Filed: Jan. 31, 2008

(65) Prior Publication Data

US 2009/0198829 A1 Aug. 6, 2009

(51) Int. Cl.
*G06F 15/16* (2006.01)

(52) U.S. Cl. ........................................................ 709/233

(58) Field of Classification Search .......... 709/223–226, 709/230–235; 370/229–240
See application file for complete search history.

(56) References Cited

U.S. PATENT DOCUMENTS

| | | | |
|---|---|---|---|
| 5,946,316 A | 8/1999 | Chen et al. | |
| 6,510,177 B1* | 1/2003 | De Bonet et al. | 375/240.16 |
| 6,515,965 B1 | 2/2003 | Hou et al. | |
| 6,611,872 B1 | 8/2003 | McCanne | |
| 6,621,805 B1 | 9/2003 | Kondylis et al. | |
| 6,850,965 B2 | 2/2005 | Allen | |
| 6,996,104 B2 | 2/2006 | Trossen et al. | |
| 7,174,385 B2 | 2/2007 | Li | |
| 7,388,841 B2* | 6/2008 | Shao et al. | 370/238 |
| 7,400,577 B2* | 7/2008 | Padmanabhan et al. | 370/229 |
| 7,426,677 B2* | 9/2008 | Chou et al. | 714/776 |
| 7,529,198 B2* | 5/2009 | Jain et al. | 370/256 |
| 7,539,767 B2* | 5/2009 | Li | 709/231 |
| 7,558,209 B2* | 7/2009 | Kodialam et al. | 370/238 |
| 7,593,333 B2* | 9/2009 | Li et al. | 370/232 |
| 7,664,109 B2* | 2/2010 | Li | 370/392 |
| 2002/0136233 A1* | 9/2002 | Chen et al. | 370/445 |
| 2003/0009535 A1* | 1/2003 | Apostolopulos et al. | 709/219 |
| 2003/0118107 A1* | 6/2003 | Itakura et al. | 375/240.19 |
| 2004/0143672 A1* | 7/2004 | Padmanabham et al. | 709/231 |
| 2005/0015511 A1* | 1/2005 | Izmailov et al. | 709/238 |
| 2005/0135477 A1* | 6/2005 | Zhang et al. | 375/240.08 |
| 2005/0185578 A1* | 8/2005 | Padmanabhan et al. | 370/229 |
| 2005/0195895 A1* | 9/2005 | Wu et al. | 375/240.1 |
| 2006/0007947 A1* | 1/2006 | Li et al. | 370/432 |
| 2006/0053209 A1* | 3/2006 | Li | 709/217 |

(Continued)

FOREIGN PATENT DOCUMENTS

WO WO2007030742 3/2007

OTHER PUBLICATIONS

Rejaie and Ortega, "PALS: Peer-to-Peer Adaptive Layered Streaming", NOSSDAV'03, Jun. 2003.*

(Continued)

*Primary Examiner* — Shirley Zhang
(74) *Attorney, Agent, or Firm* — Lee & Hayes, PLLC

(57) ABSTRACT

The described implementations relate to distributed network management and more particularly to enhancing distributed network utility. One technique selects multiple trees to distribute content to multiple receivers in a session where individual receivers can receive the distributed content at one of a plurality of rates. The technique further adjustably allocates content distribution across the multiple trees to increase a sum of utilities of the multiple receivers.

20 Claims, 5 Drawing Sheets

U.S. PATENT DOCUMENTS

| | | | |
|---|---|---|---|
| 2006/0069800 A1* | 3/2006 | Li | 709/232 |
| 2006/0080454 A1* | 4/2006 | Li | 709/231 |
| 2006/0190615 A1* | 8/2006 | Panwar et al. | 709/231 |
| 2006/0251062 A1* | 11/2006 | Jain et al. | 370/389 |
| 2007/0130360 A1* | 6/2007 | Li | 709/231 |
| 2007/0130361 A1* | 6/2007 | Li | 709/231 |
| 2007/0177579 A1* | 8/2007 | Diethorn et al. | 370/352 |
| 2007/0204321 A1 | 8/2007 | Shen et al. | |
| 2007/0286283 A1* | 12/2007 | Yin et al. | 375/240.16 |
| 2008/0211901 A1* | 9/2008 | Civanlar et al. | 348/14.09 |
| 2008/0239062 A1* | 10/2008 | Civanlar et al. | 348/14.09 |
| 2009/0031038 A1* | 1/2009 | Shukla et al. | 709/231 |
| 2009/0077254 A1* | 3/2009 | Darcie et al. | 709/231 |

OTHER PUBLICATIONS

Cui, et al., "Optimal Resource Allocation in Overlay Multicast", available at least as early as Oct. 3, 2007, at <<http://citeseer.ist.psu.edu/cache/papers/cs/33020/http:zSzzSzcairo.cs.uiuc.eduzSzpublicationszSzpaper-fileszSzreport.pdf/cui03optimal.pdf>>, pp. 35.

Dai, et al., "Maximizing Throughput in Layered Peer-to-peer Streaming", at <<http://ieeexplore.ieee.org/iel5/4288670/4288671/04288961.pdf?isnumber=4288671&prod=CNF&arnumber=4288961&arSt=1734&ared=1739&arAuthor=Dai%2C+L.%3B+Cui%2C+Y.%3B+Xue%2C+Y.&htry=1>>, IEEE, 2007, pp. 6.

Stoenescu, et al., "An Approach to Rate Allocation in Multicast", available at least as early as Oct. 3, 2007, at <<http://www.eecs.umich.edu/~mingyan/pub/cdc03.pdf>>, pp. 6.

* cited by examiner

UTILITY MANAGEMENT MECHANISM 400

TREE SELECTION COMPONENT 402

CONTENT ALLOCATION COMPONENT 404

NETWORK PERFORMANCE COMPONENT 406

FIG. 4

MULTI-RATE PEER-ASSISTED DATA STREAMING

BACKGROUND

The present application relates to distributed networks, such as peer-to-peer (P2P) networks. A distributed network can be made up of multiple inter-coupled computing systems. In contrast to traditional server-centric networks, the computing systems of a distributed network need not have fixed roles or relationships. Accordingly, the distributed network can be thought of as decentralized in that it may lack a centralized server that controls the network. Instead, individual computing systems can assume various functions. For instance, in one scenario a computing system can function as a source of content for other computing systems of the network. In another scenario, the same computing system can function as a receiver of content. In still another scenario, the computing system can help to distribute content without functioning as a source or a receiver. Further, a distributed network can have a dynamic configuration with new computing systems coming on-line or existing computing systems dropping out. The present implementations address management of these distributed networks.

SUMMARY

The described implementations relate to distributed network management and more particularly to management to enhance distributed network utility. One technique selects multiple trees to distribute content to multiple receivers in a session where individual receivers can receive the distributed content at one of a plurality of rates. The technique further adjustably allocates content distribution across the multiple trees to increase a sum of utilities of the multiple receivers.

Another implementation is directed to a distributed network configured to adjust allocated rates for multiple trees in a session based on a cost benefit utility analysis. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIG. 4 shows an exemplary utility management mechanism that can be utilized in managing distributed networks in accordance with some implementations of the present concepts.

DETAILED DESCRIPTION

Overview

This patent application pertains to distributed networks and specifically to management of distributed networks, such as peer-to-peer (P2P) networks. A distributed network can be made up of multiple inter-coupled computing systems. In contrast to traditional server-centric networks, the computing systems of a distributed network need not have fixed roles or relationships. For instance, in one session of the distributed network an individual computing system can function as a source of content and in another session the computing system can function as a receiver of content. Further, a distributed network can have a dynamic configuration with new computing systems coming on-line or existing computing systems dropping out. The present implementations offer exemplary techniques for distributing content within a session (and/or during multiple sessions) from a source to one or more receivers. For instance, the content can be distributed along paths or trees where the source is the root of the tree and the receiver(s) is a leaf of the tree. The tree may also include one or more helper computing systems which are neither sources nor receivers but which aid in distributing the content to the receiver(s). The present implementations can manage tree selection for a given session (or multiple sessions). Alternatively or additionally implementations can manage allocation or apportionment of content to the individual trees. For instance, an initial allocation can be adjusted based upon various metrics to enhance overall network utility. Utility is discussed in greater detail below, but for introductory purposes can be thought of an overall network satisfaction.

First Exemplary Distributed Network

Figure 1:
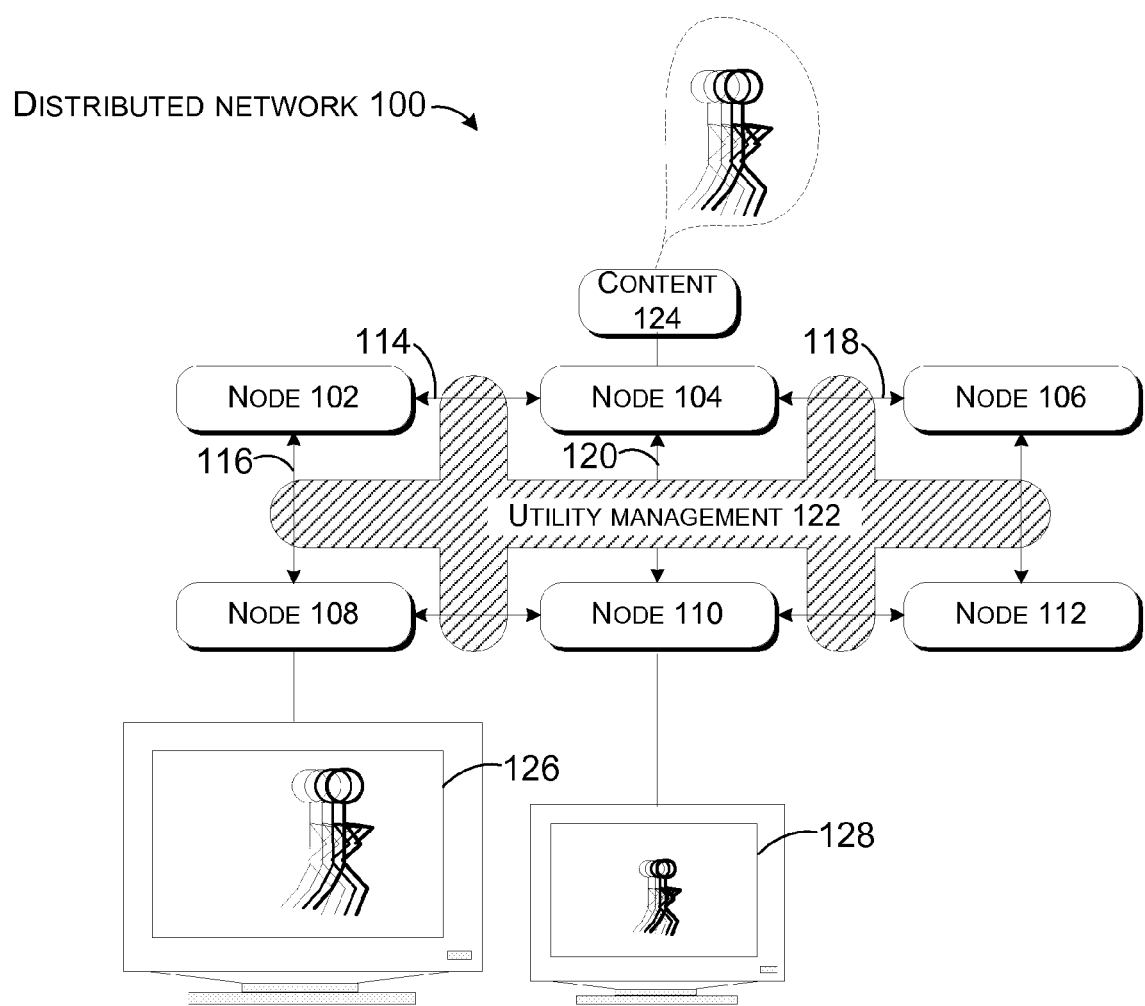
FIGS. 1-2 illustrate exemplary distributed networks that can be managed in accordance with some implementations of the present concepts.

FIG. 1 shows an exemplary distributed network 100 that includes a plurality of nodes between which content can be distributed. In this case, network 100 includes six nodes, (102, 104, 106, 108, 110, and 112). A node can be thought of as a computing system that includes a computing device and an associated communication mechanism. Examples of computing devices can include personal computers, other types of computers, such as Apple brand computers, cell phones, and personal digital assistants (PDAs), among others. Communication mechanisms can be any type of mechanism that allows the computing device to communicate over the network. Examples of communication mechanisms can include digital subscriber line (DSL) modems, cable modems, dial-up modems, and various wireless modems and technologies, among others.

Individual nodes can be coupled or linked to one or more other nodes effective that all of the network's nodes are directly or indirectly communicably coupled. For instance, node 102 is linked to nodes 104 and 108 as indicated by links 114, 116 respectively. Node 104 is also linked to nodes 106, 110 as indicated by links 118, 120 respectively, and so forth across network 100. A content handling capacity of a given link can depend upon a downlink capacity of an upstream node and an uplink capacity of a downstream node. For instance, link 120 can be defined by the downlink capacity of node 104 and the uplink capacity of node 110. The capacities of individual nodes and/or links can be thought of as metrics that can be utilized in network management.

For simplicity of explanation, the present discussion relates to content distribution in a single session. A session is defined as particular content being sent from one or more sources to one or more receivers. Multiple different sessions can occur concurrently and the present implementations can address such scenarios as will be discussed in more detail below.

In this case, distributed network 100 also includes a utility management mechanism 122 that can manage content distribution in the session. In FIG. 1, utility mechanism 122 is represented overlaying distributed network 100. This representation is intended to be symbolic or logic rather than literal as should become apparent to the skilled artisan from the discussion below. In summary, the utility mechanism 122 can facilitate content distribution across the distributed network 100. Management of content distribution can enhance and potentially maximize overall network utility as will be described in more detail below. Two simplified examples of how the utility mechanism can manage content distribution are introduced in relation to the discussion of FIG. 1, and more detailed examples are introduced in relation to subsequent Figures. These two simplified examples relate to network management through selection of network topologies (e.g., paths or trees) for content delivery in a session and management of allocation of content to the selected trees.

For purposes of explanation, consider the following scenario where node 104 acts as a source of content 124 and nodes 108, 110 want to receive the content. The content 124 can be any type of content, but assume for purposes of explanation that content 124 is media, such as video. Video content tends to be very data intensive and as such can offer a useful example for introducing the present concepts. In this case, node 104 can function as the source node and nodes 108, 110 can act as receivers of content 124 to create images 126, 128. In this case, image 126 is larger image than image 128. In this case, assume that both images are of similar resolution per unit area. Accordingly, more content is required to generate the larger image. Therefore, node 108 should receive content 124 at a higher rate than node 110 in order to satisfactorily generate the higher resolution image 126.

Various paths or trees can be utilized to transmit content 124 from source node 104 to receiver nodes 108, 110. For instance, one tree could be from node 104 to node 110 (hereinafter, referred to as "tree A"). Another tree could be from node 104 to node 110 and from node 110 to node 108 (hereinafter, referred to as "tree B"). Still another tree could be from node 104 to node 102 and from node 102 to node 108 (hereinafter, referred to as "tree C"). A further tree could be from node 104 to node 106 and from node 106 to node 112 and from node 112 to node 110 (hereinafter, referred to as "tree D"). The skilled artisan should recognize that there may be more trees available in a distributed network than can be reasonably called out for discussion purposes. Utility management mechanism 122 can select one or more trees to facilitate content 124 distribute across distributed network 100 (i.e., from source node 104 to receiver nodes 108, 110).

Assume for purposes of explanation that in this case, the utility management mechanism 122 selects tree A, tree B, and tree C from the available trees to transmit the content. In some instances, tree selection can be weighted in favor of depth-1 and depth-2 trees. A depth-1 tree is a tree that contains only the root (i.e., source) and receiver without any intervening nodes. For instance, tree A is a depth-1 tree. A depth-2 tree contains the source and receiver and a single intervening node. For example, tree C is depth-2 tree. Weighting trees in favor of depth-1 and depth-2 trees can avoid increased logistics associated with lengthy paths. Lengthy paths can be less reliable than shorter paths simply based upon the number of components and transactions involved in the lengthier paths.

Regardless of how the tree(s) is selected, the utility management mechanism can facilitate content distribution by gathering metrics relating to the selected tree(s). The metrics can relate to various network aspects such as content distribution rates, content receive rates, queuing delay or latency rates, and node availability, among others. For instance, latency can be one metric relating to a selected tree. Latency can be introduced by any tree when there is a delay between an expected delivery time for content and an actual content delivery time. Latency can be measured for an overall tree between a source and a receiver and/or across individual links of the tree. An increase in latency indicates that a tree, such as because constraints at one or more of its nodes, is not delivering the content as fast as expected or desired. In such a case, the utility mechanism can facilitate various adjustments to distributed network 100 to increase overall network utility. For instance, if tree C is experiencing relatively high latency and tree B is experiencing relatively low latency, the utility mechanism can facilitate node 104 increasing the content transmitted over tree B and decreasing the content sent over tree C. If such a change allows nodes 108 and 110 to receive content 124 at a faster rate than before the adjustment then the overall network utility can be thought of as being increased. Stated another way, the present implementations can utilize metrics to detect congestion points and then adjust the network to address the congestion points.

In summary, the present implementations can offer an infrastructure solution for distributing content in a distributed network. In one case, the infrastructure solution can distribute streaming content in a peer-to-peer manner across one or more trees. Further, these implementations can offer a technique for determining paths or trees utilized to distribute the content. Metrics of individual trees can be evaluated to determine relative allocations to the individual trees. The metrics can be re-evaluated one or more times during the session to reallocate or adjust the content between the trees to enhance network utility.

Second Exemplary Distributed Network

Figure 2:
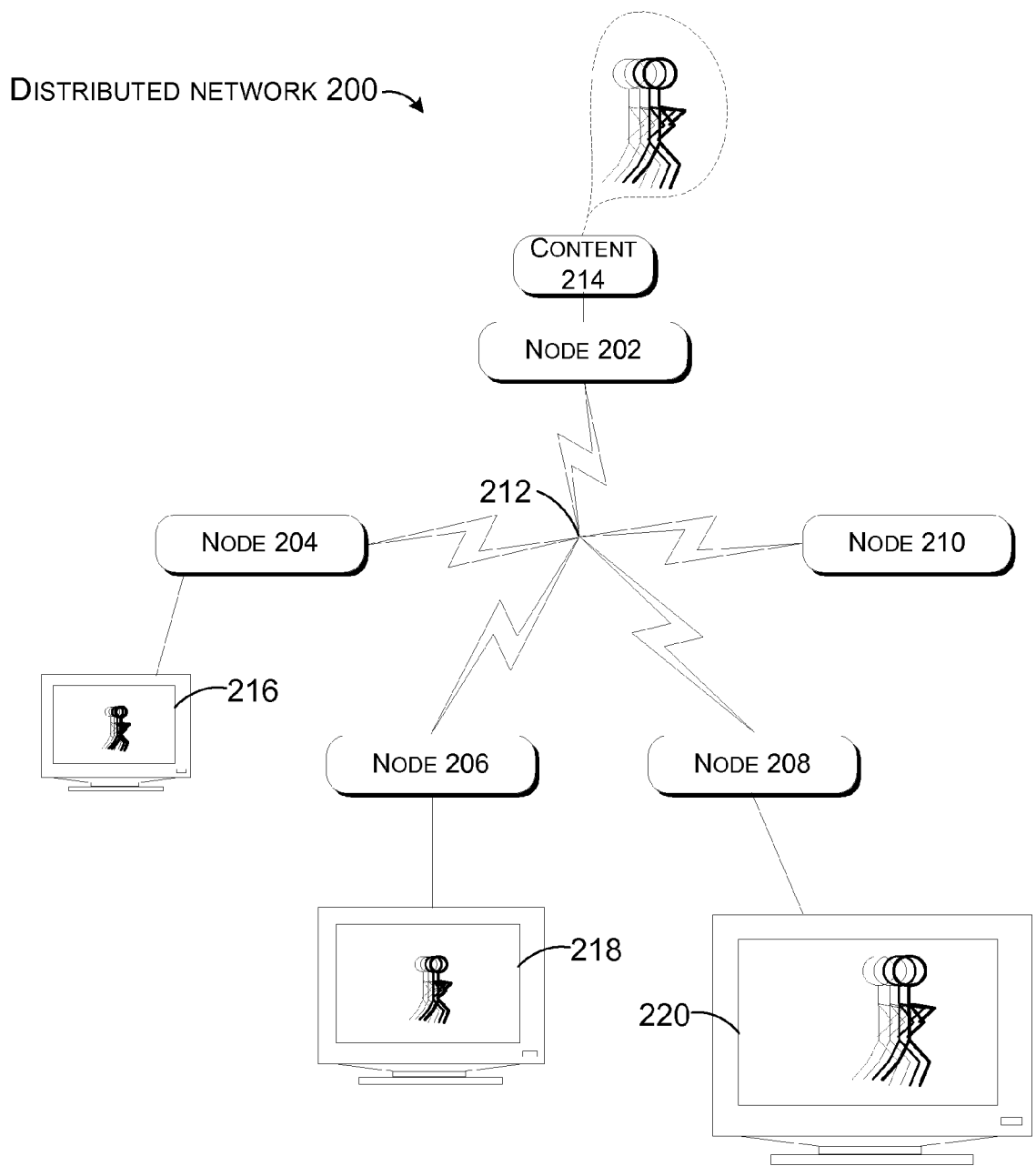
Figure 3:
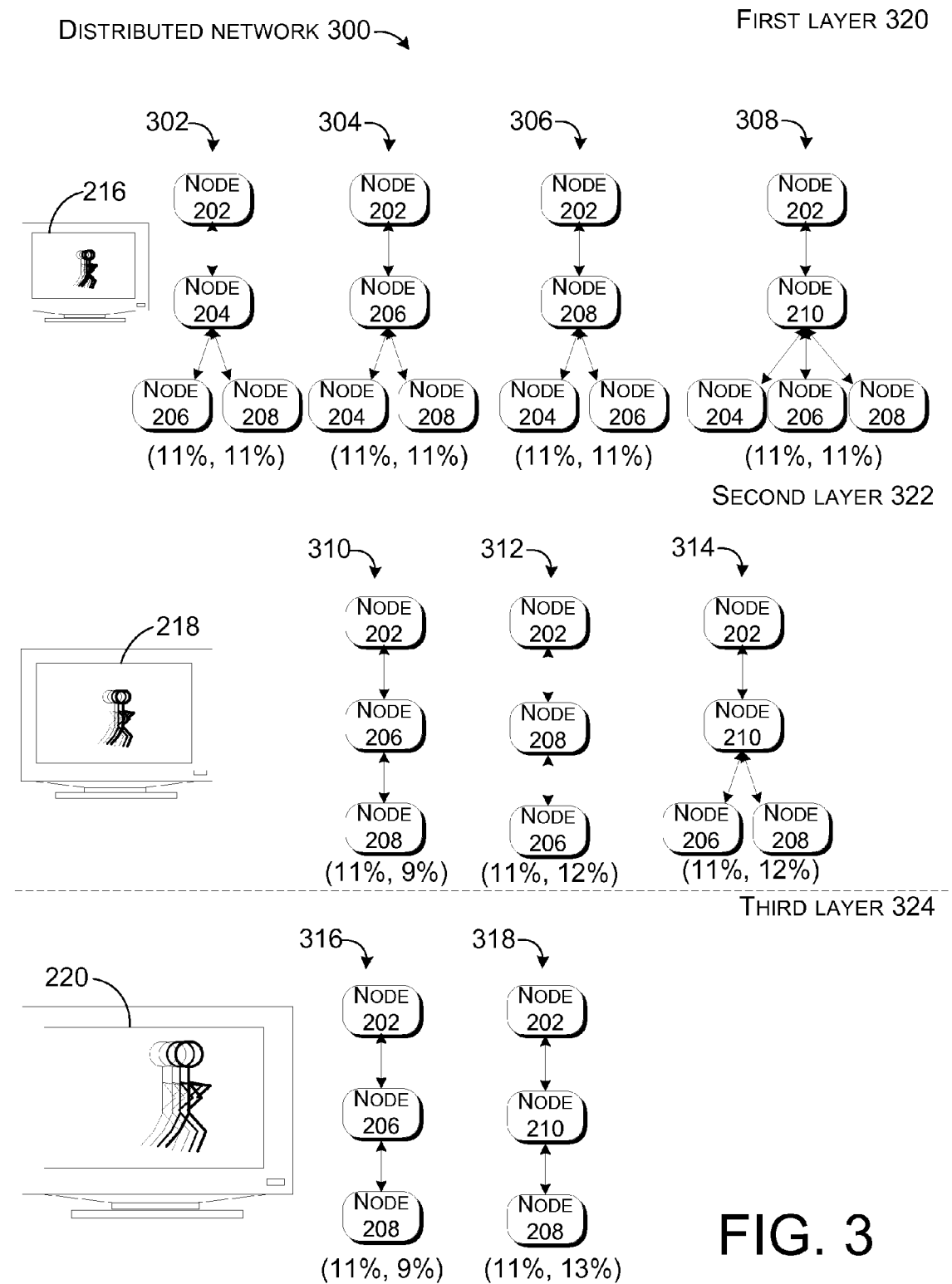
FIG. 3 shows selected trees of the exemplary distributed network of FIG. 2 that can be utilized in managing the distributed network in accordance with some implementations of the present concepts.

FIGS. 2-3 collectively show another exemplary distributed network 200 that includes a plurality of nodes. FIG. 2 shows distributed network 200 including five nodes (202, 204, 206, 208, and 210) that are symbolically communicably coupled at 212. In this case, each of nodes 202-210 can be a personal computer (PC) that is connected to a network such as the Internet. Individual PCs can be connected to the Internet through any available communication mechanism examples of which are described above.

In traditional server-client scenarios, PC users tend to download or downlink more content from the Internet (i.e., act as receivers of content) than they upload or uplink content back onto the Internet (i.e., act as sources of content). For example, users download and play videos more often than they upload videos to the Internet. Responsively, communication mechanisms are often configured to sacrifice upload or uplink speed in order to increase download or downlink speed. Such configurations, while useful in a traditional server-client relationships can cause undesired delays in a distributed network, such as a peer-to-peer (P2P) network. For instance, in a distributed network PCs often function as data sources (i.e., source nodes) and intermediaries (i.e., helper nodes) in addition to functioning as the content receivers (i.e., receiver nodes).

The present implementations can address the potential discrepancy in uplink and downlink rates of the PCs of a distributed network. For example, the present implementations can select one or more trees to distribute the content to avoid exceeding the uplink capacity of nodes of an individual tree. Alternatively or additionally, relative distribution of content to the selected trees can be adjusted based upon various metrics. For instance, relative distribution can be adjusted where one tree is experiencing greater latency than another tree. Utilizing such techniques, the present implementations can enhance (and in some instances potentially maximize) data transfer in distributed networks.

For purposes of explanation consider the following hypothetical scenario where node 202 has content 214 that nodes 204, 206, and 208 want to receive. In this instance, node 210 is neither a source nor a receiver but may be involved in distribution of the content (i.e., helper node). Further assume that node 204 is generating a relatively low resolution image 216 from content 214, node 206 is generating a relatively higher resolution image 218, and node 208 is generating the highest resolution image 220. Accordingly, node 204 can receive the content at a relatively low rate, node 206 at a higher rate, and node 208 at the highest rate in order to create the desired images.

In this case each receiving node 204-208 can be thought of as having its own utility. Generally, an individual receiving node's utility can be thought of as whether the node received the source's content at the receiving node's desired rate (i.e., a rate sufficient to generate the desired image at the desired resolution). Accordingly, in the case of multiple receiving nodes, one node may experience a relatively high degree of utility while another node experiences a relatively low utility. For instance, a first node may receive the source content at or above a rate needed to generate a desired image while a second node receives the source content below the needed rate. The present implementations can consider the utility of individual nodes in determining an overall network utility. These implementations can then facilitate enhancing and/or even potentially maximizing overall utility.

While FIG. 2 shows a "snap-shot" of a specific point in time, the distributed system is not necessarily static during a session. For instance, a user of node 208 may temporarily reduce or even minimize image 220 thereby reducing the content rate requirements of node 208. Similarly, the user of node 204 might enlarge image 216 thereby increasing the rate requirements of node 204. The present implementations can address changing conditions within and/or between sessions to enhance overall utility.

FIG. 3 shows examples of trees selected from distributed network 200 to distribute content 214. In this case, four trees 302, 304, 306, 308 can be selected to transfer content 214 at a rate sufficient for image 216. In this configuration individual receiving nodes 204-208 receive data through one or more of these trees to create low resolution image 216. Three additional trees 310, 312, and 314 can be utilized for an increased content transfer rate to nodes 206, 208. Finally, still additional trees 316, 318 can be utilized for an increased content transfer rate to node 208 for image 220. Stated another way, in order to generate a larger image with the same resolution as a smaller image, content is received at a higher rate. Accordingly, each of nodes 204-208 receives a first layer 320 of content. Nodes 206 and 208 receive an additional or second layer 322 of content that when added to the first layer is sufficient to generate image 218. Node 208 receives a third layer 324 of content that when added to the first two is sufficient to generate image 220.

In summary each of nodes 204, 206, and 208 can receive the content at the low rate sufficient for image 216. Trees 310-314 provide additional content distribution that, when combined with the data from trees 302-308, can be sufficient for the resolution of image 218. Similarly, node 208 receives further content through trees 316 and 318 that in combination with the content received from trees 302-308 and 310-314 can be sufficient to generate high resolution image 220. Accordingly, distributed network 200 can be thought of as a multirate multicast distributed network. Distributed network 200 is multirate in that different receiver nodes can receive the content at different rates. In this case, the receiver nodes 204-208 can receive the content at one of three different rates. Distributed network 200 is multicast in that content from a single source (e.g., node 202) can be sent to multiple receivers (e.g., nodes 204-208). Considered another way, the content can be split into multiple streams and helper nodes can be utilized to reduce uplink bottlenecks.

As mentioned above, individual nodes can have different properties. For instance, one node can have a lower uplink capacity than another node. So, if the former node is in one tree and the latter node is in a second tree, then sending equal amounts of content through the two trees may not be the best approach for achieving overall network utility. The present implementations can address such differences and can make adjustments to the relative rates that content is sent to the two trees to address the differences in capacity. This is but one metric that can be addressed by the present implementations. For instance, the present implementations can recognize that an individual node may simultaneously be part of trees of two different sessions. In such an instance, the capacity of the node can be reduced by an amount dedicated to the other session(s) thereby further reducing the capacity available for a given session. The present implementations can make adjustments to address such a situation within a session and/or between sessions.

In some cases, the present implementations can address overall system utility from a cost benefit perspective. For instance, consider a hypothetical scenario where receiving node 204 is receiving the source data at a very low rate of say 100 kilo bytes per second (kbs). In such a case, making adjustments to the distributed network to supply 200 kbs should produce a significant improvement in image quality and utility to receiving node 204. Further assume that the increase in rate for node 204 was taken evenly from trees supplying receiving nodes 206 and 208. Further assume that the receiving rate of node 206 was reduced from 1,000 kbs to 950 kbs and that the receiving rate of node 208 was reduced from 2,000 kbs to 1,950 kbs to supply the additional rate for node 204. In this case, the improvement to node 204 should be quite substantial while the diminished quality to nodes 206, 208 should be relatively insignificant. In such a case, from a cost benefit perspective the significant increase in utility to node 204 should tend to outweigh the cost to nodes 206, 208 so overall system utility is increased.

Compare the above example, to another hypothetical scenario where node 208 wants to receive the source content at 10,000 kbs to generate image 220 but is only receiving the content at 9,000 kbs. To increase the utility to node 208, node 204 would have to be decreased from 1,000 kbs to 666 kbs. Similarly, node 206 would need to be lowered from 2,000 kbs to 1,333 kbs. In this case, both of nodes 204, 206 would suffer about a 33% decrease in resolution to produce a 10% increase in resolution for node 208. In this scenario, overall utility may not be served by making the changes to satisfy node 208. The skilled artisan should recognize other implementations, some of which are described in more detail below. In one particular implementation described below, the cost benefit of overall utility is approached as a concave function. In one such instance, a concave function is examined for each receiver node. In some implementations, a source can evaluate individual nodes of individual trees for cost benefit analysis without having to know what other sources are doing in the network. For example, assume that source node 202 receives feedback from nodes 206 and 208 indicating increased latency at node 204 of tree 302. In this case, source node 204 can incrementally redistribute some of its content to one or more of trees 304, 306, and 308 which do not rely on the uplink of node 204. If the increased allocation does not increase the latency to trees 304-308 (or if the increased latency is still preferable over the latency of node 204) then the source node can continue to incrementally reallocate still additional content from tree 302 to trees 304-308. Overall network utility can be increased with this technique. Eventually, the reallocation may produce latency in trees 304-308 that prevents any more overall network utility improvements in a given scenario.

Consider still another example where each of the selected trees FIG. 3 is initially allocated about 11% of the content for distribution. The initial (and subsequent) allocation can be seen below each tree 302-318 in FIG. 3. Further, assume that trees 310 and 316 begin to experience high latency and thereby cause difficulties in generating images 218 and 220. In such a case, some implementations can reallocate some of the allocated distribution of trees 310, 316 into other trees in the second and third layers, 322, 324. So for instance, as evidenced in FIG. 3, the allocation of tree 310 is reduced from 11% to 9% while the allocation of trees 312, 314 is increased from 11% to 12%. Similarly, tree 316 is reduced from 11% to 9% while tree 318 is increased from 11% to 13%. Performance metrics of the trees can be reevaluated after a period of time. For purposes of explanation, assume that the latency of trees 310 and 316 is greatly reduced while the latency of trees 312, 314, and 318 are not significantly increased. Such an adjustment to the second and third layer allocation rates may significantly increase utility to the receivers of the second and third layers without a significant negative impact (i.e., negative utility) to the first layer receivers. This is but one example of how overall utility can be enhanced with the present implementations. For instance, this example is based upon overall tree performance whereas other examples can be based upon individual node performance or link performance between nodes, among others.

As mentioned above, the distributed network tends not to be static, but instead experiences changing conditions. For instance, if receiver node 208 switches from a high resolution image 220 to low resolution image 216 the utility management function can readjust the distributed network. For instance, trees 316 and 318 can be inactivated and a reselection of trees can occur. Alternatively or additionally, automatic reallocation of the selected trees can increase utility in delivering the content at a sufficient rate for image 216 to nodes 204-208 and at a sufficient rate for image 218 to node 206.

Exemplary Utility Management Mechanism

FIG. 4 shows an example of components or modules of an exemplary utility management mechanism 400. In this case, the modules include a tree or path selection component 402, a content allocation component 404, and a network performance component 406. The utility management mechanism 400 and/or one or more of the associated components 402-408 can be employed by nodes of a distributed network, such as distributed networks 100 and 200 described above. Alternatively or additionally, the utility management mechanism 400 and/or one or more of the associated components 402-408 can be employed by one or more computing devices that are not a portion of a distributed network, but which interact with the network.

The tree selection component 402 can be configured to discover at least one routing path or tree available between the source node and the receiving node(s). The tree selection component can select one or more of the discovered trees to distribute the content. The tree selection component can repeat either of both of the discovery and selection functions either periodically or upon detection of a change to network metrics. For instance, if a node drops out of the network, then discover and selection functions can be repeated.

The content allocation or apportionment component 404 can be configured to set and or adjust the apportionment of the content distribution among the selected trees. The content allocation component can utilize various metrics to set the original allocation between the trees. In some instances, the content allocation component can begin by equally dividing the content among the selected trees. The content allocation component can then adjust the allocation based upon metrics provided by network performance component 406. For example, if a node is detected to be performing well (with high capacity and a short routing delay), then the tree(s) that include that node may be adjusted for an increased apportionment of the content. Conversely, a node that has little capacity and a long routing delay may be less utilized by reducing the apportionments or allocation of the content to trees that include the node.

First Exemplary Utility Management Method

This discussion provides a detailed example of a method consistent with the concepts of utility management in a distributed network discussed above. This method addresses (among others) multirate multicast in Peer-to-Peer (P2P) applications where different receivers in the same group can receive video at different rates using, for example, layered coding. The quality of the video received by each receiver in each group can be modeled as a concave utility function of the received video rate. This method addresses utility maximization in P2P applications, in which aggregate application—specific utilities are maximized by running distributed algorithms on P2P nodes.

The method develops primal and primal—dual based distributed algorithms to enhance and/or potentially maximize the aggregate utility of all receivers in all groups. The distributed algorithms can be readily implemented and deployed on today's Internet.

A. Problem Solving

In multirate multicast, receivers for the same source can receive at different rates. So in this case, let $U_r^s$ be the utility associated with receiver r for receiving content from source s and let the corresponding rate be $x_r^s$. In this implementation, the utility functions $U_r^s$ are assumed to be strictly concave and increasing. Other implementations can utilize other configurations. In this case, let the set of sources be S and let the set of receivers for each source $s \in S$ be $R_s$. Denote the set of all nodes by N. Then, the utility maximization problem is stated as:

$$\text{maximize} \sum_{s \in S} \sum_{r \in R_s} U_r^s(x_r^s)$$

subject to $\{x_r^s\} \in$ feasible region.

In this instance, before considering the optimization aspect of the problem, the discussion first addresses what rate region for $\{x_r^s\}$ should be considered.

B. Rate Region Without Inter-Source Coding

In this section, the discussion characterizes the potentially maximum possible rate region without coding across packets belonging to different sources (i.e., in this case there is no inter-session coding where a session is associated with a source).

For purposes of discussion, let $y_e^{sr}$ denote the routing variables for routing flow from source s to receiver $r \in R_s$. Then, the rate variables $\{x_r^s\}$ satisfy the following linear constraints for some choice of the routing variables $\{y_e^{sr}\}$.

$$\sum_{e \in E+(i)} y_e^{sr} - \sum_{e \in E-(i)} y_e^{sr} = \begin{cases} +x_r^s & \text{if } i = s \\ -x_r^s & \text{if } i = r \\ 0 & \text{otherwise} \end{cases} \quad (1)$$
$$\forall i \in N, r \in R_s, s \in S$$

$$\sum_{s \in S} \max_{r \in R_s}(y_e^{sr}) \leq c_e \forall e \in E \quad (2)$$

The discussion denotes A as the rate region given by constraints (1)-(2) above.

C. Rate Region Without Inter-Layer Coding

Suppose for a given source s, the receiver rates are ordered as $$x_{i_1}^s \leq x_{i_2}^s \leq \ldots \leq x_{i_{|R_s|}}^s$$

Then, the rate $x_{i_1}^s$ can be interpreted as a base layer (say, layer 1) received by all nodes in $R_s$. The next higher layer, layer 2, has rate $(x_{i_2}^s - x_{i_1}^s)$ and is received by all nodes in $R_s - \{i_1\}$. In general, layer l, $1 < l \leq |R_s|$ has rate $(x_{i_l}^s - x_{i_{l-1}}^s)$ and is received by all nodes in $R_s - \{i_1, i_2, \ldots, i_{l-1}\}$.

Without network coding between layers of the same source or across different sources, the rate region for $\{x_r^s\}$ can be described by the following constraints and is achievable by network coding across packets belonging to the same layer of the same source. This discussion will use $\min^j$ to denote the $j^{th}$ minimum of a set of numbers. For j=1, $\min^1$ is the usual minimum.

For purposes of discussion let $y_e^{sjr}$ denote the routing variables for routing flow corresponding to layer j from source s to receiver $r \in R_s$. Then, the rate variables $\{x_r^s\}$ satisfy the following linear constraints for some choice of routing variables $\{y_e^{sjr}\}$.

$$\sum_{e \in E+(i)} y_e^{sjr} - \sum_{e \in E-(i)} y_e^{sjr} = \begin{cases} +z^{sj} & \text{if } i = s \\ -z^{sj} & \text{if } i = r \\ 0 & \text{otherwise} \end{cases} \quad (3)$$
$$\forall i \in N, r \in R_S, 1 \leq j \leq |R_S|, s \in S$$

$$\sum_{s \in S} \sum_{j=1}^{|R_s|} \max_{r \in R_s}(y_e^{sjr}) \leq c_e \forall e \in E \quad (4)$$

$$z^{s1} = \min_{r \in R_s}(x_r^s) \forall s \in S \quad (5)$$

$$z^{sj} = \min_{r \in R_s}^j (x_r^s) - \min_{r \in R_s}^{j-1} (x_r^s) \quad (6)$$
$$\forall 1 < j \leq |R_s|, s \in S$$

The discussion utilizes B to denote the rate region given by constraints (3)-(6) above. Clearly, the rate region B can be achieved by network coding across packets belonging to the same layer from the same source.

D. Structure of Optimal Solution for Rate Region B

The discussion now considers the structure of the optimal solution for rate region B. This section shows that a potentially optimal solution consists of a linear superposition of flows of two types of trees, namely, depth-1 and depth-2 trees. They are defined as follows:

Depth-1 type tree: Rooted at a given source s and reaching a subset of receivers in $R_s$ through direct link(s) from s.

Depth-2 type tree: Rooted at a given source s, reaching a receiver $r \in R$, or a non-receiver $h \in N - R_s - \{s\}$ through a direct link from s, and a subset of receivers in $R_s$ through direct link(s) from the latter node.

Suppose for purposes of discussion that the ordering of receiver rates $x_r^s$, $r \in R_s$ for each source $s \in S$ is known. This ordering can be represented by:

$$\pi = (\pi^s, s \in S)$$

where $\pi^s$ is a permutation of the receivers $r \in R_s$. The number of such different $\pi$ is $\Pi_{s \in S} |R_s|!$. This discussion uses $\pi_i^s$ to denote the $i^{th}$ receiver in permutation order for source s.

For discussion purposes, let $B(\pi)$ denote the subset of rate region B where the receiver rates $x_r^s$ for any given source s are ordered according to $\pi$. This method first establishes that the rate region $B(\pi)$ can be achieved by a linear superposition of flows along depth-1 and depth-2 type trees.

The rate $B(\pi)$ can be achieved by a linear superposition of flows along depth-1 and depth-2 type trees as explained in the following description. In one scenario, consider a given source $s \in S$. For this source, the receiver rates are ordered as:

$$x_{\pi_1^s}^s \leq x_{\pi_2^s}^s \leq \ldots \leq x_{\pi_{|R_s|}^s}^s$$

The rate $x_{\pi_1^s}^s$ can be interpreted as a case layer (say, layer 1) received by all nodes in $R_s$. The next higher layer, layer 2, has rate $(x_{\pi_2^s}^s - x_{\pi_1^s}^s)$ and is received by all nodes in $R_s - \{\pi_1^s\}$. In general, layer j, $1 < j \leq |R_s|$ has rate $(x_{\pi_j^s}^s - x_{\pi_{j-1}^s}^s)$ and is received by all nodes in $R_s - \{\pi_1^s, \pi_2^s, \ldots, \pi_{j-1}^s\}$.

Since for rate region B, there is no network coding across data from different sources or different layers corresponding to the same source, it is sufficient to route each layer of each source along depth-1 and depth-2 trees (as in MutualCast) in order to achieve the rate region $B(\pi)$.

The lemma below states that certain depth-2 trees not be considered when routing the layers for a given source for layer j, these are the depth-2 trees that use a helper node which is a receiver for a lower layer but not for layer j.

In an optimal solution for the rate region $B(\pi)$, for each source $s \in S$, node $\pi_j^s$ (for any $1 \leq j < |R_s|$) will not be a helper in the depth-2 trees considered for layers (j+1) and higher.

Note that non-receiver nodes for source s can participate as helpers for depth-2 type trees for this source. Thus, the number of trees used to distribute layer 1 for source s is at most $1 + |R_s| + (|N| - |R_s| - 1) = |N|$. Using the above lemma, the total number of trees that need to be considered for routing data from source s in order to achieve the rate region $B(\pi)$ for any given $\pi$ is $$|N| + (|N| - 1) + \ldots + (|N| - |R_s| + 2)(|N| - |R_s|) =$$

$$|N||R_s| - \frac{(|R_s|)(|R_s| - 1)}{2} - 1$$

which is quadratic in the total number of peer nodes in the network.

The discussion now returns to the optimization problem over the entire region B. Since receivers' rates for the same source may be different in the multirate multicast problem, this implementation does not directly use the MutualCast result to restrict the number of trees to be considered in order to achieve the rate region B. The theorem below establishes that the potentially optimal solution in B can indeed be expressed as a linear superposition of flows along depth-1 and depth-2 type trees.

The optimal solution in rate region B can be expressed as a union of the rate regions $B(\pi)$ over all $\pi$, the equation is:

$$B = U_\pi B(\pi)$$

From the above discussion beginning at paragraph 49, it is known that a potentially optimal solution in each rate region $B(\pi)$ can be expressed as a linear superposition of flows along depth-1 and depth-2 type trees. By taking the best solution among the optimal solution for rate region $B(\pi)$, this implementation obtains a potentially optimal solution for rate region B. This establishes the result.

E. Receiver-Independent Utility Functions Per Source

This discussion now considers the special case when all receivers for the same source have the same utility function. Then, it can be expected that an optimal solution allocates equal rates to all receivers for the same source. This is, in fact, true and is established in the following theorem.

In relation to rate region B, if $U_r^s = U^s \forall r \in R_s$, $s \in S$ (receiver utility functions are identical for the same source), then there exists an optimal solution in which $x_r^s = x^s \forall r \in R_s$, $s \in S$ (receiver rates are identical for the same source).

Consider further that for rate region B, if $U_r^s = U^s \forall r \in R_s$, $s \in S$ (receiver utility functions are identical for the same source) and the utility functions $U^s$ are strictly concave, then every potentially optimal solution has $x_r^s = x^s \forall r \in R_s$, $s \in S$ (receiver rates are identical for the same source).

E. Primal and Primal-Dual Algorithms Given the Orderings of Receiver Rates

In this section, the discussion considers two distributed algorithms to maximize the aggregate utilities in the rate region without inter-layer coding shown in (3)-(6).

For every source s, assume the order of the optimal solutions is known, denoted by $\pi^s$, and the receiver rates are ordered as $$x_{\pi_1^s}^s \leq x_{\pi_2^s}^s \leq \ldots \leq x_{\pi_{|R_s|}^s}^s.$$

Let $\pi = [\pi^s, s \in S]^T$

Clearly, to maximize the aggregate utilities in rate region B, it is sufficient to do so over the rate region $B(\pi)$. From previous analysis, to maximize the aggregate utilities in $B(\pi)$, it is sufficient for sources to perform layer coding, deliver each layer using MutualCast trees (with no helper on each tree), and adjust each tree rate to achieve the maximum aggregate utilities.

A tree $m \in s$ is a set of links and peer or helper nodes that the tree passes through; receiver nodes on a tree receive the same content at the same rate. The present implementations denote the rate of tree m at time t as $\xi_{m(t)}$. Rates of the trees rooted at source s sum up to the source rate $x_s(t)$. The injecting rate of link j is the aggregate rate of the trees that pass through link j, and is denoted by $\lambda_j(t)$, given by, $$\lambda_j(t) \triangleq \sum_{s \in S} \sum_{m \in s: j \in m} b_j^m \xi_m(t), \forall j \in J. \quad (8)$$

where $b_j^m$ is the number of times that multicast tree m contains physical link to j. The injecting rate of a link j is sum of the rates of tree branches passing through j. Since different branches of a Multicast tree can pass through the same physical link, the tree rates might be counted multiple times when computing the injecting rate of a link, hence the multiplication with $b_j^m$.

1) A Packet Marketing Based Primal Algorithm: The Primal algorithm follows the penalty approach, by relaxing the constraints by adding penalty to the objective function whenever constraints are violated. In particular, the discussion studies the following version of the problem:

$$\max_{\{\xi_m\}} \sum_{s \in S} \sum_{r \in R_s} U_r^s(x_r^s) - \sum_{j \in J} \int_0^{\lambda_j} q_j(w) dw, \quad (9)$$

where $$\int_0^{\lambda_j} q_j(w) dw$$

is the price associated with violating the capacity of constraint of link j. If $q_j(\bullet)$ is non-decreasing, continuous and not always zero, then the above optimization problem is concave and has at least one equilibrium. The strict concavity of $U_r^s(\bullet)$ indicates that x is unique for any optimal solution. If $$-\int_0^{\lambda_j} (w) dw$$

is also strictly concave, then $\lambda_j$, $j \in J$, are also unique.

This implementation chooses $$q_j(w) = \frac{(w - C_j)^+}{w}$$

for link j. In terms of ECN marking, it represents the packet marking probability. Consider the following Primal algorithm: $\forall s \in S$, $\forall m \in s$, $$\dot{\xi}_m = f_m(\xi_m)\left(\sum_{r \in m} U_r'^s(x_r^s) - \sum_{j \in m} b_j^m q_j(\lambda_j)\right) \quad (10)$$

where $f_m(\xi_m)$ is a positive function adjusting the rate of adaptation for $\xi_m$.

It is straightforward to show that the above system globally asymptotically converges to one of its equilibria and the convergence is actually semi-globally exponentially fast.

2) A Queuing Delay Based Primal-dual Algorithm: Another way to solve concave optimization problems in a distributed manner, is to look at its Lagrangain:

$$L(\xi, p) = \sum_{s \in S} \sum_{r \in R_s} U_r^s(x_r^s) - \sum_{j \in J} p_j(\lambda_j - C_j), \quad (11)$$

where $p_j$ is the Langrangian multiplier, and can be interpreted as the price of using link j. Since the original problem is a concave optimization problem with linear constraints, strong duality holds and there is no duality group. Any optimal solution of the original problem and one of its corresponding Lagrangian multiplier is a saddle point of L over the set $\{\xi \geq 0, p \geq 0\}$, and vice versa, Further, $\{\xi, p\}$ is one such saddle point of L if and only if it satisfies the Karush-Kuhn-Tucker conditions: $\forall s \in S$, $\forall m \in J$.

$$p_j \geq 0, \lambda_j \leq C_j, p_j(\lambda_j - C_j) = 0, \quad (12)$$

$$\sum_{r \in m} U_r'^s(x_r^s) = \sum_{j \in m} b_j^m p_j = 0. \quad (13)$$

The first equation is the complementary slackness condition. The optimal Lagrangian multiplier can be nonzero only if the capacity constraint of link j is activated, i.e., $\lambda_j = C_j$. For discussion purposes, denote the set containing all $\{\xi, p\}$ that satisfy the above conditions by E. As the original problem has at least one solution, E contains at least one point and is therefore not empty.

There could be multiple saddle points of L since the original optimization problem is not strictly concave. To pursue one of the saddle points, consider the following Primal-dual algorithm, over the set $\{\xi \geq 0, p \geq 0\}$: $s \in S, \forall m \in s$, and $j \in J$, $$\dot{\xi}_m = k_m \left( \sum_{r \in m} U_r'^s(x_r^s) - \sum_{j \in m} b_j^m p_j \right) \quad (14)$$

$$\dot{p}_j = \frac{1}{C_j} (\lambda_j - C_j)^+_{p_j}, \quad (15)$$

where $k_m$ is a positive constant controlling the adaptation rate of tree m and $(\lambda_j - C_j)_{P_j}^+ = \lambda_j(t) - C_j$ if $P_j > 0$, and is max $(0, \lambda_j - C_j)$ otherwise. It is known that $P_j$ adapted according to (15) can be interpreted as queuing delay. Every saddle point of L is an equilibrium of the above system.

The algorithm described in (14)-(15) can be implemented by each link generating its queuing delay and each source adjusting the rates of its trees by collecting incentives to increase the tree rates from different receivers, i.e., the derivative of their utility functions, and the sum of the queuing delays introduced by using the trees. The algorithm is suitable for implementation in a distributed manner in today's Internet.

Second Exemplary Utility Management Method

Figure 5:
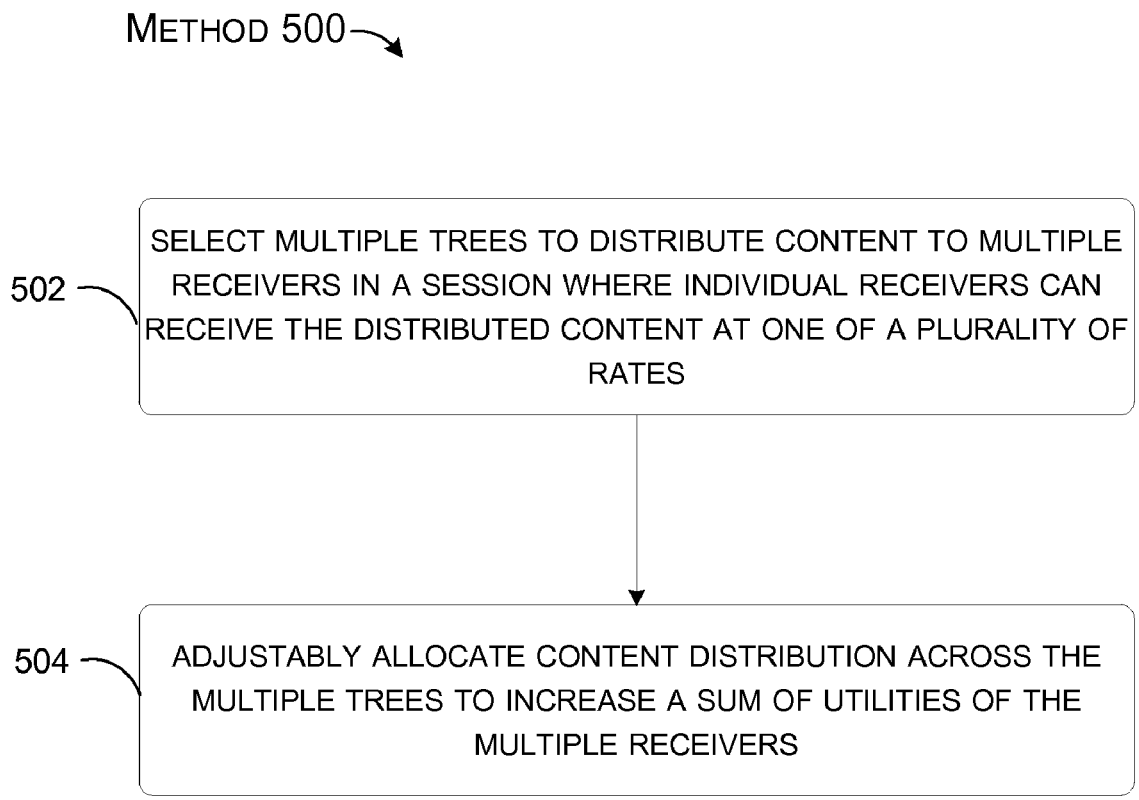
FIG. 5 is flow diagram of an exemplary method relating to managing distributed networks in accordance with some implementations of the present concepts.

FIG. 5 is a flowchart of another utility management method or technique 500. The order in which the method 500 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device, causes the computing device to perform the method.

At block 502, the method selects multiple trees to distribute content to multiple receivers in a session where individual receivers can receive the distributed content at one of a plurality of rates. For instance, in one case a first receiver (i.e., first receiving node) can receive content at a first rate. A second receiver (i.e., second node) can receive the content at a second higher rate. Such a configuration can among other aspects allow the receivers to use the content in different ways. For instance, in the case of video content the first receiver can generate a relatively small image from the content while the second receiver can generate a relatively larger image (of generally equal resolution) from the content.

At block 504 the method adjustably allocates content distribution across the multiple trees to increase a sum of utilities of the multiple receivers. In one case, multiple trees for distributing the content from a source node to the first and second receiving nodes can be selected. In some instances, some portion of the content can then be sent over the selected trees. The performance of individual trees and/or nodes can be evaluated based upon one or more metrics. Adjustments can be made (i.e., reallocation of content among the trees) in order to increase overall network utility.

CONCLUSION

The above discussion relates to utility management of a distributed network. Although techniques, methods, devices, systems, etc., pertaining to utility management are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer implemented method, comprising:
    under control of one or more computer systems comprising a processor that executes instructions retained in a computer-readable medium, the instructions when executed by the processor implement at least the following operations:
    allowing a first end node in a distributed network to receive content from a source node at a first rate and a second end node in the distributed network to receive the content from the source node at a second higher rate, wherein the content is encoded with multiple layers;
    determining a number of layers of the multiple layers to be received by the first end node and the second end node;
    selecting a first tree comprising a first set of nodes for distributing the content from the source node to the first end node;
    selecting a second tree comprising a second set of nodes for distributing the content from the source node to the second end node; and
    adjusting the first rate that the content is distributed to the nodes of the first tree and/or the second rate that the content is sent to the nodes of the second tree based, at least in part, on:
        examining a first utility for the first receiving end node, the first utility being a representation of potential image quality to the first receiving end node;
        examining a second utility for the second receiving end node, the second utility being a representation of potential image quality to the second receiving end node;
        determining an overall utility based on the first utility and the second utility, the overall utility maximizing potential image quality to the first receiving end node and the second receiving end node.

2. The computer implemented method of claim 1, wherein the allowing comprises allowing both the first set of nodes and the second set of nodes to receive a first layer of content and allowing the second set of nodes to receive a second layer of content that when added to the first layer satisfies the second higher rate.

3. The computer implemented method of claim 1, wherein the allowing comprises allowing the first set of nodes to receive a first layer of content, and the second set of nodes to receive a second layer of content, and a third set of nodes to receive both first and second layers, and allowing the third set of nodes to combine the first and second layers to satisfy a higher content distribution rate than either of the first and second layers taken individually.

4. The computer implemented method of claim 1, further comprising allocating content distribution for each node of the first tree and each node of the second tree based upon metrics of each respective node.

5. The computer implemented method of claim 1, further comprising allocating content distribution for each node of the first tree and each node of the second tree based upon dynamic network conditions of each respective node.

6. The computer implemented method of claim 4, wherein the metrics comprise link capacity of each respective node.

7. The computer implemented method of claim 5, further comprising distributing a portion of the content over a particular set of nodes in the first tree and reallocating the remaining content between other nodes in the first tree based upon performance of each respective node to increase network utility.

8. The computer implemented method of claim 1, wherein the overall utility is determined by a concave function.

9. One or more computer readable storage media encoded with instructions that, when executed, direct a computing device to perform operations comprising:
   allowing a first end node in a distributed network to receive content from a source node at a first rate and a second end node in the distributed network to receive the content from the source node at a second higher rate, wherein the content is encoded with multiple layers;
   determining a number of layers of the multiple layers to be received by the first end node and the second end node;
   selecting a first tree comprising a first set of nodes for distributing the content from the source node to the first end node;
   selecting a second tree comprising a second set of nodes for distributing the content from the source node to the second end node; and
   adjusting the first rate that the content is distributed to the nodes of the first tree and/or the second rate that the content is sent to the nodes of the second tree based, at least in part, on:
      examining a first utility for the first receiving end node, the first utility being a representation of potential image quality to the first receiving end node;
      examining a second utility for the second receiving end node, the second utility being a representation of potential image quality to the second receiving end node;
      determining an overall utility based on the first utility and the second utility, the overall utility maximizing potential image quality to the first receiving end node and the second receiving end node.

10. The one or more computer readable storage media of claim 9, wherein the allowing comprises allowing both the first set of nodes and the second set of nodes to receive a first layer of content and allowing the second set of nodes to receive a second layer of content that when added to the first layer satisfies the second higher rate.

11. The one or more computer readable storage media of claim 9, wherein the allowing comprises allowing the first set of nodes to receive a first layer of content, and the second set of nodes to receive a second layer of content, and a third set of nodes to receive both first and second layers, and allowing the third set of nodes to combine the first and second layers to satisfy a higher content distribution rate than either of the first and second layers taken individually.

12. The one or more computer readable storage media of claim 9, further comprising allocating content distribution for each node of the first tree and each node of the second tree based upon metrics of each respective node.

13. The one or more computer readable storage media of claim 9, further comprising allocating content distribution for each node of the first tree and each node of the second tree based upon dynamic network conditions of each respective node.

14. The one or more computer readable storage media of claim 12, wherein the metrics comprise link capacity of each respective node.

15. The one or more computer readable storage media of claim 9, further comprising distributing a portion of the content over a particular set of nodes in the first tree and reallocating the remaining content between other nodes in the first tree based upon performance of each respective node to increase network utility.

16. A system, comprising:
   one or more processors; and
   memory, communicatively coupled to the one or more processors, storing a component configured to:
   allow a first end node in a distributed network to receive content from a source node at a first rate and a second end node in the distributed network to receive the content from the source node at a second higher rate, wherein the content is encoded with multiple layers;
   determine a number of layers of the multiple layers to be received by the first end node and the second end node;
   select a first tree comprising a first set of nodes for distributing the content from the source node to the first end node;
   select a second tree comprising a second set of nodes for distributing the content from the source node to the second end node; and
   adjust the first rate that the content is distributed to the nodes of the first tree and/or the second rate that the content is sent to the nodes of the second tree based, at least in part, on:
      examine a first utility for the first receiving end node, the first utility being a representation of potential image quality to the first receiving end node;
      examine a second utility for the second receiving end node, the second utility being a representation of potential image quality to the second receiving end node;
      determine an overall utility based on the first utility and the second utility, the overall utility maximizing potential image quality to the first receiving end node and the second receiving end node.

17. The system of claim 16, wherein the allowing comprises allowing both the first set of nodes and the second set of nodes to receive a first layer of content and allowing the second set of nodes to receive a second layer of content that when added to the first layer satisfies the second higher rate.

18. The system of claim 16, wherein the allowing comprises allowing the first set of nodes to receive a first layer of content, and the second set of nodes to receive a second layer of content, and a third set of nodes to receive both first and second layers, and allowing the third set of nodes to combine the first and second layers to satisfy a higher content distribution rate than either of the first and second layers taken individually.

19. The system of claim 16, further comprising allocating content distribution for each node of the first tree and each node of the second tree based upon metrics of each respective node.

20. The system of claim 16, further comprising allocating content distribution for each node of the first tree and each node of the second tree based upon dynamic network conditions of each respective node.

* * * * *